United States Patent
Du et al.

(10) Patent No.: US 10,375,351 B2
(45) Date of Patent: *Aug. 6, 2019

(54) SYSTEM AND METHOD FOR IMPLEMENTING VIDEO CALLS

(71) Applicant: Alibaba Group Holding Limited, George Town (KY)

(72) Inventors: Wuping Du, Hangzhou (CN); Wei Peng, Hangzhou (CN); Ming Zong, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,324

(22) Filed: May 19, 2017

(65) Prior Publication Data

US 2018/0027210 A1    Jan. 25, 2018

Related U.S. Application Data

(63) Continuation of application No. 14/561,635, filed on Dec. 5, 2014, now Pat. No. 9,693,014.

(30) Foreign Application Priority Data

Dec. 30, 2013    (CN) .......................... 2013 1 0746516

(51) Int. Cl.
*H04N 7/14* (2006.01)
*H04L 29/08* (2006.01)
(Continued)

(52) U.S. Cl.
CPC ......... *H04N 7/141* (2013.01); *H04L 12/1813* (2013.01); *H04L 51/046* (2013.01);
(Continued)

(58) Field of Classification Search
CPC ........ H04N 7/141; H04N 7/152; H04N 7/147; H04N 1/00334; H04L 51/046;
(Continued)

(56) References Cited

U.S. PATENT DOCUMENTS 8,548,139 B2    10/2013    Dahl
2006/0218291 A1*    9/2006    Zhu ..................... H04L 65/1069
                                                709/229

(Continued)

FOREIGN PATENT DOCUMENTS

EP        0797337        9/1997

OTHER PUBLICATIONS

Ebling et al., Bar Codes Everywhere You Look, IEEE Pervasive Computing, Apr.-Jun. 2010, vol. 9, No. 2, pp. 4-5.
(Continued)

*Primary Examiner* — Stella L. Woo
(74) *Attorney, Agent, or Firm* — Van Pelt, Yi & James LLP (57) ABSTRACT

Embodiments of the present application relate to a method for implementing video calls, a system for implementing video calls, and a computer program product for implementing video calls. A method for implementing video calls is provided. The method includes maintaining persistent connections with a plurality of terminals used to make video calls, each terminal having a universally unique identifier, receiving a video call request from a calling terminal via one of the persistent connections, the video call request including the universally unique identifier of the calling terminal, equipment descriptive information of the calling terminal, and the universally unique identifier of a called terminal, notifying the called terminal via one of the persistent connections, the notification being based on the universally unique identifier of the called terminal, receiving a response (Continued)

from the called terminal, and establishing a video call channel based on the received response.

12 Claims, 7 Drawing Sheets (51) Int. Cl.
*H04N 1/00* (2006.01)
*H04L 12/18* (2006.01)
*H04N 7/15* (2006.01)
*H04L 29/06* (2006.01)
*H04L 12/58* (2006.01)
*G06K 7/14* (2006.01)
*H04L 29/12* (2006.01)

(52) U.S. Cl.
CPC .............. *H04L 51/28* (2013.01); *H04L 65/00* (2013.01); *H04L 65/1069* (2013.01); *H04L 67/10* (2013.01); *H04N 1/00334* (2013.01); *H04N 7/147* (2013.01); *H04N 7/152* (2013.01); *G06K 7/1404* (2013.01); *H04L 61/1535* (2013.01); *H04L 61/2092* (2013.01); *H04L 61/6022* (2013.01)

(58) Field of Classification Search
CPC ..... H04L 51/28; H04L 65/1069; H04L 65/00; H04L 12/1813; H04L 67/10; H04L 61/6022; H04L 61/2092; H04L 61/1535; G06K 7/1404
See application file for complete search history.

(56) References Cited

U.S. PATENT DOCUMENTS

| | | |
|---|---|---|
| 2010/0039496 A1 | 2/2010 | Kazemi |
| 2010/0066804 A1 | 3/2010 | Shoemake |
| 2013/0126619 A1 | 5/2013 | Del Fiume |
| 2013/0176380 A1 | 7/2013 | Hogan |
| 2013/0240618 A1* | 9/2013 | Hall ................. G06F 17/30873 235/375 |
| 2013/0329870 A1 | 12/2013 | Mairs |
| 2013/0329875 A1* | 12/2013 | Mairs .................. H04M 7/0024 379/93.19 |
| 2014/0043423 A1 | 2/2014 | Lindberg |
| 2014/0112333 A1 | 4/2014 | Oberle |
| 2014/0164341 A1* | 6/2014 | Baratta ............. G06F 17/30867 707/706 |
| 2014/0203071 A1* | 7/2014 | Eggert .............. G06F 17/30002 235/375 |
| 2014/0362734 A1* | 12/2014 | Winkler-Teufel ....... H04W 4/21 370/254 |

OTHER PUBLICATIONS

Liao et al., A Novel User Authentication Scheme Based on QR-Code, Journal of Networks, Aug. 2010, vol. 6, No. 8, pp. 937 941.
Vazquez-Briseno et al., Using RFID/NFC and QR-Code in Mobile Phones to Link the Physical and the Digital World, Interactive Multimedia, Mar. 2012, pp. 219-242, InTech.

* cited by examiner

SYSTEM AND METHOD FOR IMPLEMENTING VIDEO CALLS

CROSS REFERENCE TO OTHER APPLICATIONS

This application is a continuation of co-pending U.S. patent application Ser. No. 14/561,635, entitled SYSTEM AND METHOD FOR IMPLEMENTING VIDEO CALLS filed Dec. 5, 2014 which is incorporated herein by reference for all purposes, which claims priority to People's Republic of China Patent Application No. 201310746516.6 entitled A METHOD AND A SYSTEM FOR REALIZING VIDEO CALLS, filed Dec. 30, 2013 which is incorporated herein by reference for all purposes.

FIELD OF THE INVENTION

The present application relates to a system and method for implementing video calls.

BACKGROUND OF THE INVENTION

Typically, before establishing a video call, a calling terminal and a called terminal both are to be separately pre-registered with a video call service. Then the calling terminal calls the called terminal's account identifier. After the called terminal receives the dialed identifier, the called terminal accepts and can immediately establish the call. Both the calling terminal and the called terminal use universally unique identifiers. If one terminal does not have a registered identifier, then the one terminal cannot be called.

Currently, televisions are provided with unique identifiers online and one way to make a video call is the following: Users are logged in with Wangwang™ or some other instant messaging (IM) communication product, and then the users use their IM account numbers as universally unique identifiers. However, the availability of IM account numbers is not sufficient to cover all user groups. Many users exist that do not have IM account numbers. Also, if a user has an IM account number, existing methods for implementing video calls do not allow the user to make online inter-device video calls when the user is to conduct video calls between the user's cell phone and a plurality of televisions at home.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
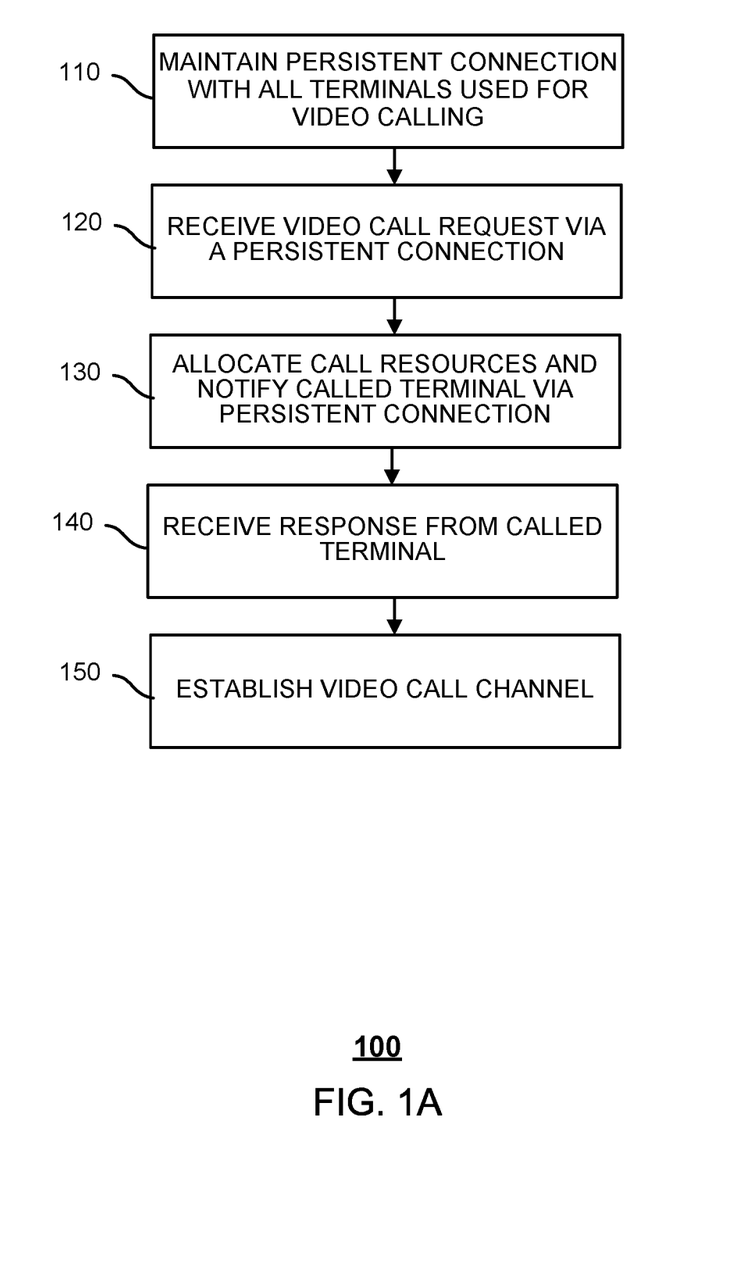
FIG. 1A is a flowchart illustrating an embodiment of a process for implementing video calls.

FIG. 1A is a flowchart illustrating an embodiment of a process for implementing video calls. In some embodiments, the process 100 is implemented by a server 420 of FIG. 4 and comprises:

In 110, following activation, a server maintains persistent connections with all terminals used for video calling. Following activation, the terminal is capable of maintaining a persistent connection with the server. Examples of a terminal being activated include turning on a smart television (TV), turning on a tablet, etc. Each terminal acquires its own universally unique identifier. In some embodiments, a terminal can be household equipment, such as a smart phone or a smart television set with network communication, data processing, and data storage capabilities. For example, the smart phone or smart television set has one or more processors and one or more memories coupled to the processors to provide intelligence such as maintaining a database of contacts, making video calls, etc. In some embodiments, the persistent connections are implemented via Transmission Control Protocol (TCP) connections, Reliable User Datagram Protocol (RUDP) connections, or other appropriate connection types. In some embodiments, the persistent connections do not require login and registration.

In some embodiments, a technique whereby the terminal acquires its own universally unique identifier comprises:

In one example, the terminal generates a universally unique identifier (UUID) based on hardware information such as an International Mobile Equipment Identity (IMEI) or a media access control (MAC) address and sends the UUID to the server. Subsequently, the server sends a message to the terminal based on the UUID. Techniques for generating UUIDs are understood by persons skilled in the art. For example, the UUID can be generated, e.g., by performing hash calculations, such as MD5 or SHA, on the IMEI, MAC address, current time, system process number, and other such information to obtain a unique character string, such as a UUID.

In another example, the terminal acquires its own universally unique identifier as follows: The server generates a UUID based on an IMEI, a MAC address, and other hardware information of the terminal. For example, laptops, smartphones, computers, tablets, etc. can have IMEIs, MAC addresses, or other hardware information. Techniques for generating a UUID are understood by persons skilled in the art and further details are omitted for conciseness. For example, the UUID can be generated by performing hash calculations such as MD5 or SHA, on the IMEI, MAC address, current time, system process number, and other such information of the terminal to obtain a unique character string, such as a UUID and issue the UUID to the terminal. This UUID serves as a universally unique identifier for the terminal. Obtaining the universally unique identifier through the server can more effectively exclude the possibility of conflicts involving the generation of identical identifiers or duplicate identifiers.

In some embodiments, the calling terminal includes its own universally unique identifier, its own equipment descriptive information, and a universally unique identifier of a called terminal in a video call request, and sends the video call request to the server via the persistent connections. At this point, the calling terminal is the initiating party (among terminals that participate in the video call).

In 120, the server receives a video call request from the calling terminal.

In some embodiments, prior to the sending of the video call request, one terminal (calling terminal) acquires contact information of another terminal (called terminal) used for video calling. The acquiring of the contact information of the other terminal comprises:

In a QR code approach, for example, a cell phone scans a QR code displayed on a television, automatically adds the television as a contact, and via a persistent connection causes the television to add the cell phone as a contact.

For example, the QR code displayed on the television is generated and displayed on the television using the UUID of the television and equipment descriptive information of the television. The equipment descriptive information includes IMEI, MAC address, etc. Techniques for generating QR codes are understood by persons skilled in the art.

As an example, the scanning of the QR code displayed on the television and the automatically adding of the television as the contact comprises: the cell phone scans the QR code displayed on the television, acquires the UUID of the television and equipment descriptive information of the television, and adds the television as a contact of the cell phone. At the same time, via the persistent connection (e.g., TCP, RUDP, etc.) with the server and the acquired television UUID, the cell phone sends the UUID of the cell phone and equipment descriptive information of the cell phone to the television. Subsequently, the television also adds the cell phone as a contact.

Because of the relatively large volume of QR code transmission information, other approaches for adding contact information which serves to enhance user experience exist. In an identifier approach, for example, the server automatically allocates a currently unique identifier to a terminal, such as a television or a cell phone. Another terminal used for video calling, such as a telephone or a cell phone, may add the terminal (i.e., the television or cell phone) as a contact by adding the currently unique identifier. In some embodiments, the identifier corresponds to an alphanumerical string comprising numbers, letters, or a combination thereof. In some embodiments, the server ensures the uniqueness of the allocated identifier by increasing the numerical value incrementally or through a hash algorithm. The allocated identifier can be a currently unique identifier, such as a simple number or letter, e.g., 5.

In 130, the server allocates call resources and notifies a called terminal via a persistent connection based on a universally unique identifier of the called terminal. Examples of call resources include calling channels, calling lines, etc. In other words, after the calling terminal issues a call, the server receives a video call request from the calling terminal, notifies the called terminal via the persistent connection, and waits for the called party to accept.

In 140, the server receives a response from the called terminal.

In 150, after receiving a response from the called terminal, the server establishes a video call channel, and the calling terminal and the called terminal conduct a video call via the established video call channel.

In some embodiments, the establishing of the video call channel comprises: establishing a point-to-point (P2P) channel between the calling and called terminals that are the two parties to the video call, or establishing a stream server relay channel. The establishing of the video call channel via the stream server relay channel involves relaying the video call through a stream server. The establishing of the video call channel is understood by persons skilled in the art and further details are omitted for conciseness. In some embodiments, in the event that a P2P channel connection cannot be made, all of the audiovisual data will be sent by the calling terminal to the server, and the server will then transmit the audiovisual data by a Transmission Control Protocol (TCP), a User Datagram Protocol (UDP), a Reliable User Datagram Protocol (RUDP), or other such protocol to the called terminal.

When the terminals used for video calling conduct video calls using the process 100 of FIG. 1A, the terminals do not need to be registered, nor do the terminals require a manual login. Instead, the inter-terminal video call is simply implemented using persistent connections established between the terminals and the server and with a universally unique identifier for each terminal.

Furthermore, the process 100 performs inter-terminal information exchange based on the QR code approach or the identifier approach. Two terminals thereby automatically add the other terminal as a contact, thus performing the video call between the two terminals.

In some embodiments, the process 100 further comprises: The video call ends when either of the terminals used for video calling disconnects or if the network is interrupted. Many techniques for disconnecting the video call exist. For example, one of the terminals actively disconnects, i.e., in response to a user request to disconnect the one terminal, sends a disconnect request to the server, and the server notifies the other terminal of the disconnect request. In another example, one of the terminals passively disconnects during the call, i.e., the other terminal receives a server notification of terminal disconnect for the other terminal and itself withdraws from the call. In yet another example, an abnormal disconnect occurs, i.e., disconnect caused by, for example, a network or a power outage. If the persistent connection experiences a network abnormality, the other terminal used for video calling automatically withdraws from the call when one terminal receives an abnormality notification. If the server receives the abnormality notification, the server is to instruct each party to the call that the party is to withdraw from the call.

The following is a description of a video call between a cell phone and a television based on the process 100.

First of all, both the cell phone and the television establish a TCP connection with the server. Moreover, the server issues the terminals' universally unique identifiers. Thus, the server performs an MD5 calculation (hash algorithm) using an IMEI number, a MAC address, the current time, a system process ID, or other such information of the cell phone to obtain unique character string 1, i.e., UUID1, which the server issues to the cell phone. The server performs an MD5 calculation (hash algorithm) using a MAC address, the current time, a system process ID, or other such information of the television to obtain unique character string 2, i.e., UUID2, which the server issues to the television.

Then, assuming that the television has already used its own UUID and equipment descriptive information to generate a QR code, the television displays the generated QR code. At this point, the cell phone scans the QR code displayed on the television and thereby automatically adds the television as a contact. In other words, the cell phone acquires the television UUID1 and the equipment descriptive information of the television and adds the television as a contact for the cell phone. At the same time, the cell phone sends the cell phone's own UUID2 and equipment descriptive information to the television via the persistent connection with the server and the acquired television UUID1. The television thereby adds the cell phone as a contact. This way, people at in-person gatherings may bring their devices together and exchange UUID information, so that later they can make video calls to each other without requiring special user account information.

Next, assuming that the cell phone is the calling terminal, the cell phone is to include its own universally unique identifier UUID2, equipment descriptive information, and the universally unique identifier UUID1 of the called terminal, i.e., the television, in a video call request and send the video call request to the server via the persistent connection. The server allocates call resources and notifies the television via the persistent connection based on the universally unique identifier UUID1 of the television. In other words, after the cell phone issues a call, the server reserves a session request for the cell phone, notifies the television via the persistent connection, and waits for the television to accept the session request.

After the server receives a response from the television, a P2P channel is established between the cell phone and the television. The cell phone and the television conduct a video call via the P2P channel.

Figure 1B:
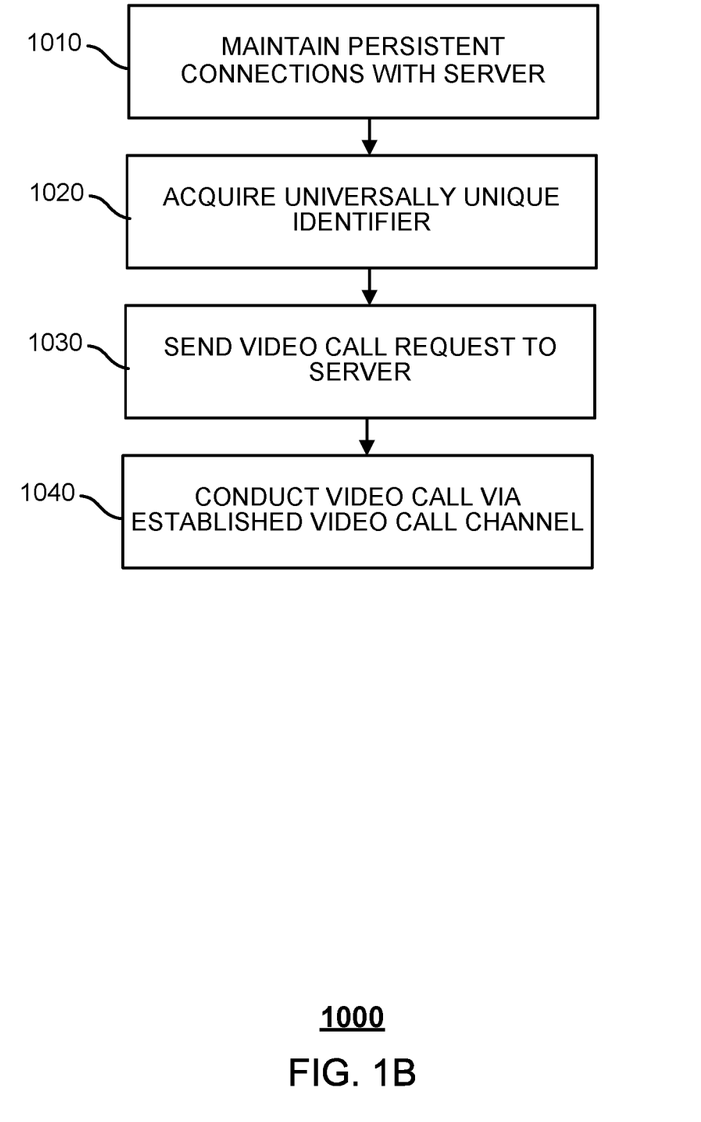
FIG. 1B is a flowchart illustrating another embodiment of a process for implementing video calls.

FIG. 1B is a flowchart illustrating another embodiment of a process for implementing video calls. In some embodiments, the process 1000 is implemented by a calling terminal 410 of FIG. 4 and comprises:

In 1010, the calling terminal maintains a persistent connection with a server.

In 1020, the calling terminal acquires a universally unique identifier.

In 1030, the calling terminal sends a video call request to the server. In some embodiments, the video call request includes a universally unique identifier of a called terminal.

In 1040, the calling terminal conducts a video call with the called terminal via an established video call channel.

Figure 2A:
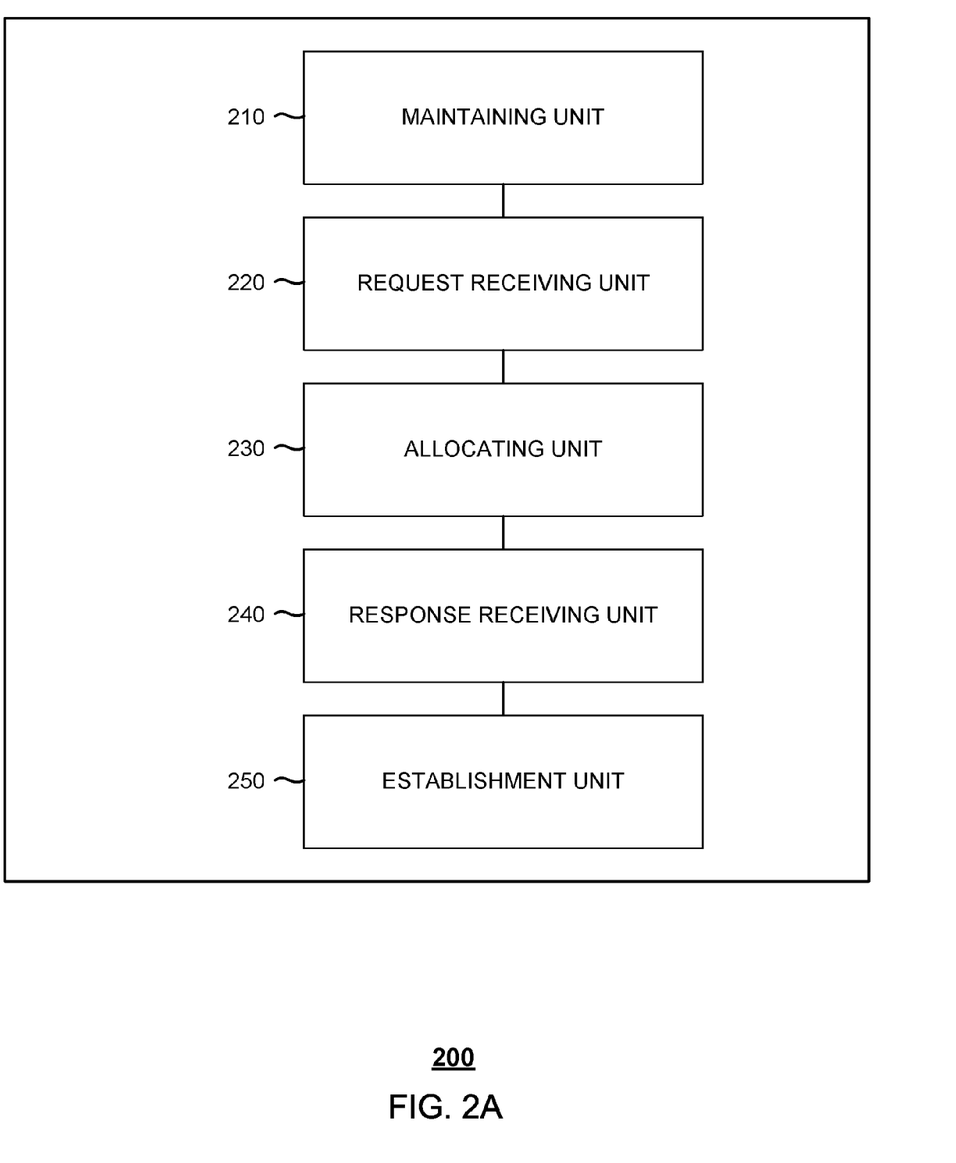
FIG. 2A is a diagram illustrating an embodiment of a device for implementing video calls.

FIG. 2A is a diagram illustrating an embodiment of a device for implementing video calls. In some embodiments, the device 200 implements the process 100 of FIG. 1A and comprises: a maintaining unit 210, a request receiving unit 220, an allocating unit 230, a response receiving unit 240, and an establishment unit 250.

In some embodiments, the maintaining unit 210 is configured to, following activation, maintain persistent connections with all terminals used for video calling.

In some embodiments, the request receiving unit 220 is configured to receive a video call request from a calling terminal via a persistent connection.

In some embodiments, the calling terminal can be household equipment, such as a smart phone or a smart television set with network communication, data processing, and data storage capabilities. For example, the smart phone or smart television set has one or more processors and one or more memories coupled to the processors to provide intelligence such as maintaining a database of contacts, making video calls, etc. In some embodiments, the persistent connections are implemented via Transmission Control Protocol (TCP) connections, Reliable User Datagram Protocol (RUDP) connections, or other appropriate connection types. In some embodiments, the persistent connections do not require login and registration.

In some embodiments, the allocating unit 230 is configured to allocate call resources and notify a called terminal via a persistent connection. For example, after the calling terminal issues a call, the server receives a video call request from the calling terminal, notifies the called terminal via the persistent connection, and waits for the called party to accept.

In some embodiments, the response receiving unit 240 is configured to receive a response from the called terminal. For example, the called terminal sends a response to a server.

In some embodiments, the establishment unit 250 is configured to establish a video call channel.

In some embodiments, the establishing of the video call channel comprises: establishing a point-to-point (P2P) channel between the calling and called terminals that are the two parties to the video call, or establishing a stream server relay channel. In some embodiments, in the event that a P2P channel connection cannot be made, all of the audiovisual data will be sent by the calling terminal to the server, and the server will then transmit the audiovisual data by a Transmission Control Protocol (TCP), a User Datagram Protocol (UDP), a Reliable User Datagram Protocol (RUDP), or other such protocol to the called terminal.

Figure 2B:
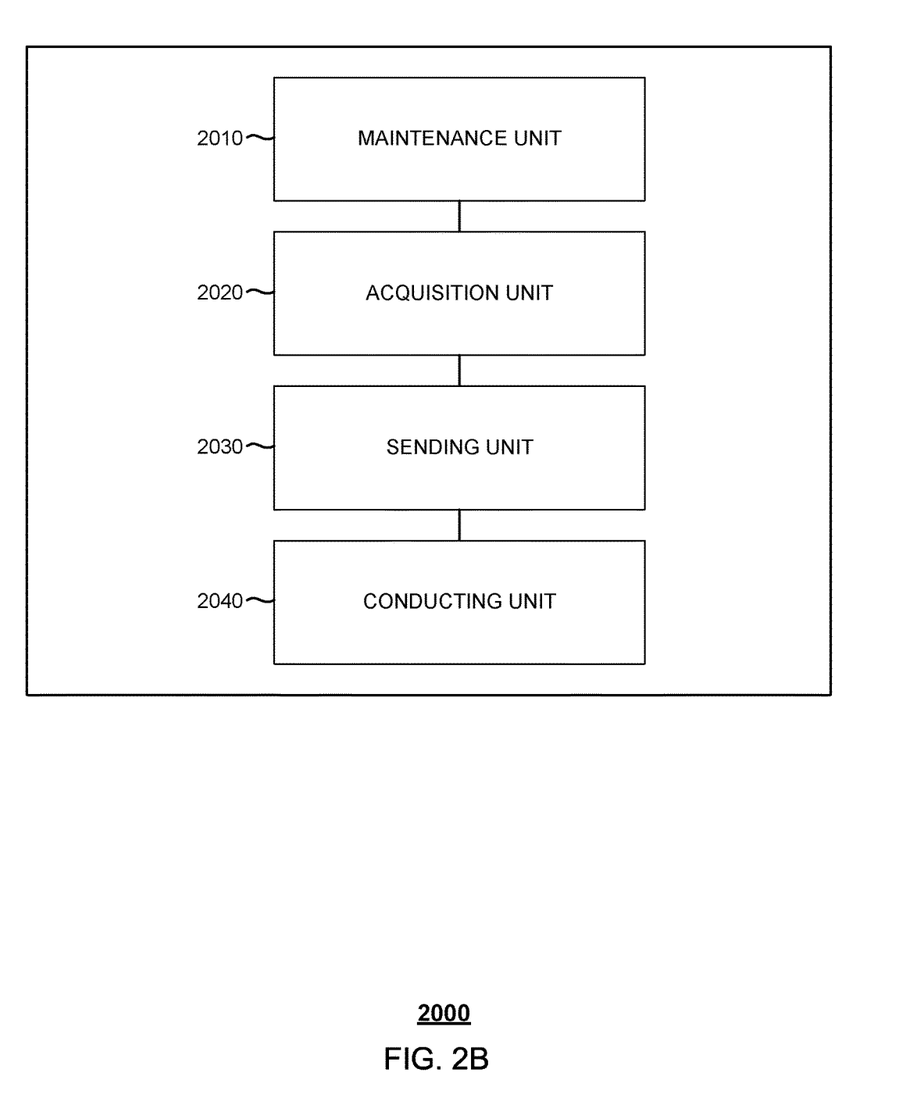
FIG. 2B is a diagram illustrating another embodiment of a device for implementing video calls.

FIG. 2B is a diagram illustrating another embodiment of a device for implementing video calls. In some embodiments, the device 2000 implements the process 1000 of FIG. 1B and comprises a maintenance unit 2010, an acquisition unit 2020, a sending unit 2030, and a conducting unit 2040.

In some embodiments, the maintenance unit 2010 is configured to maintain a persistent connection with a server.

In some embodiments, the acquisition unit 2020 is configured to acquire a universally unique identifier. In some embodiments, the video call request includes a universally unique identifier of a called terminal.

In some embodiments, the sending unit 2030 is configured to send a video call request to the server. In some embodiments, the video call request includes a universally unique identifier of a called terminal.

In some embodiments, the conducting unit 2040 is configured to conduct a video call with the called terminal via an established video call channel.

Figure 3:
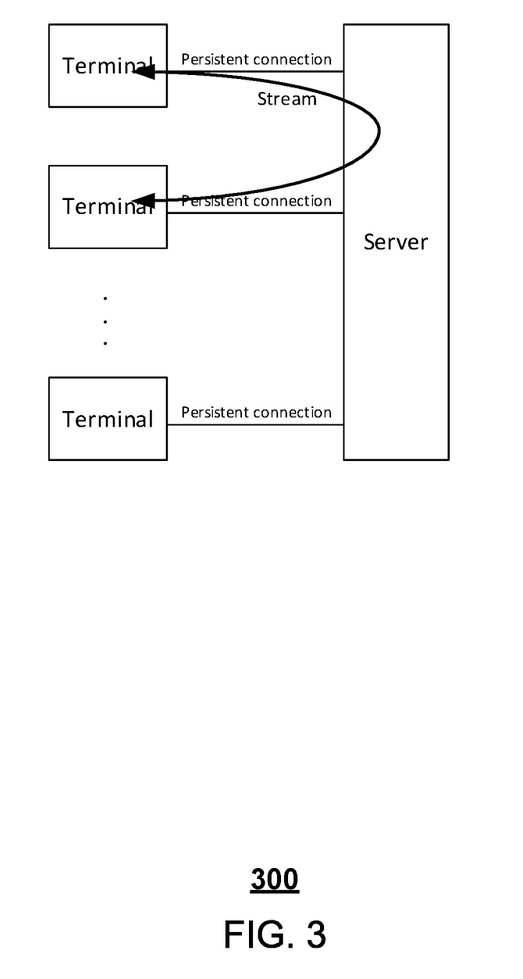
FIG. 3 is a structural component diagram illustrating an embodiment of a system for implementing video calls.

FIG. 3 is a structural component diagram illustrating an embodiment of a system for implementing video calls. In some embodiments, the system 300 includes a server and at least two terminals used for video calling. In some embodiments, following activation, the terminals maintain persistent connections with the server and acquire their own universally unique identifiers.

In some embodiments, to make a video call, one terminal serving as a calling terminal includes its own universally unique identifier, its own equipment descriptive information, and a universally unique identifier of another terminal serving, as a called terminal, in a video call request, and sends the video call request to the server via the persistent connections. Subsequently, a video call channel is established between the calling terminal and the called terminal, and a video call is conducted with the called terminal and the calling terminal via the video call channel.

In some embodiments, the server maintains persistent connections with the terminals. The server receives video call requests from calling terminals and notifies the called terminal based on a universally unique identifier of the called terminal via the persistent connections. After receiving a response from the called terminal, the server establishes a video call channel between the calling terminal and the called terminal.

In some embodiments, the called terminal receives a notification from the server and sends back a response to the server. The called terminal conducts a video call via the video call channel with the calling terminal that issued the video call request.

Furthermore, in some embodiments, one terminal scans the Quick Response code displayed on another terminal used for video calling and the one terminal automatically adds the other terminal as a contact and via the persistent connections causes the one terminal to add the other terminal as a contact.

Furthermore, in some embodiments, the server further individually allocates a currently unique identifier to each of the terminals maintaining a persistent connection with the server.

In some embodiments, the terminal further inputs a currently unique identifier allocated by the server for another terminal used for video calling and thereby the other terminal adds the terminal as a contact.

Figure 4:
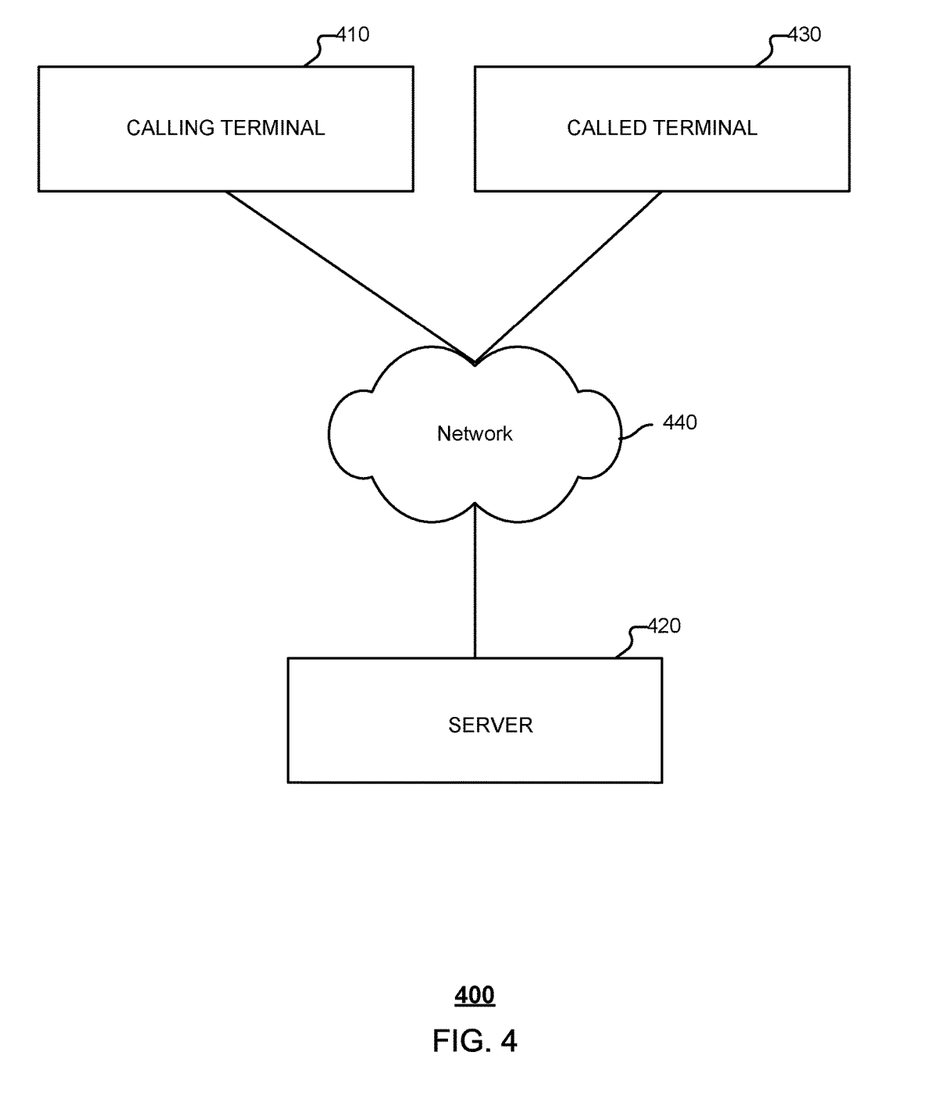
FIG. 4 is a diagram illustrating an embodiment of a system for implementing video calls.

FIG. 4 is a diagram illustrating an embodiment of a system for implementing video calls. In some embodiments, the system 400 includes a calling terminal 410, a called terminal 430, and a server 420. In some embodiments, the calling terminal 410, the called terminal 430, and a server 420 are connected to each other via a network 440.

In some embodiments, the calling terminal 410 sends a request to the server 420 via a persistent connection, and the server 420 notifies the called terminal 430 via a persistent connection. After receiving a response from the called terminal 430, the server establishes a video call channel so that the calling terminal 410 and the called terminal 430 can conduct a video call via the video call channel.

Figure 5:
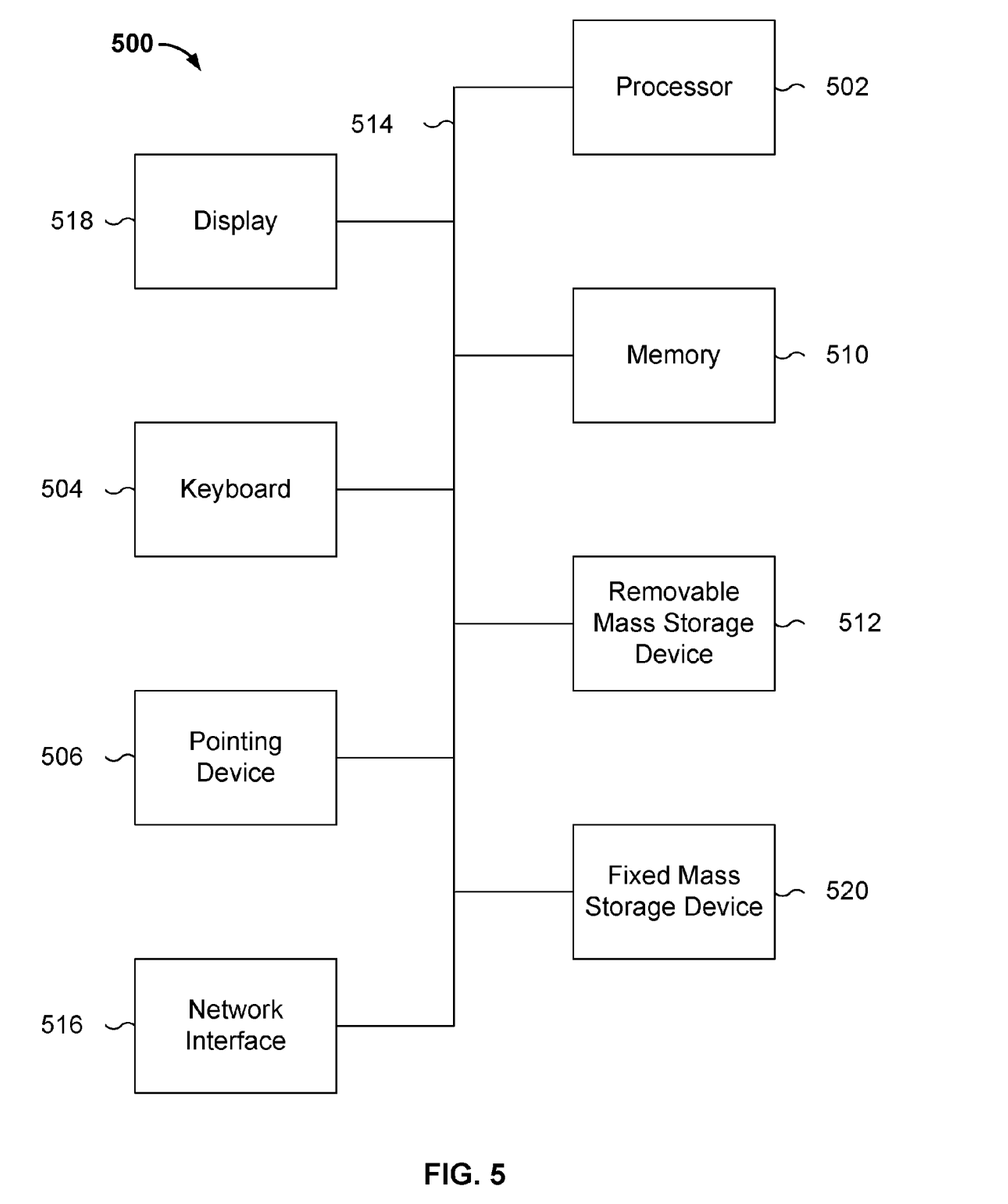
FIG. 5 is a diagram illustrating an embodiment of a computer system for implementing video calls.

FIG. 5 is a functional diagram illustrating an embodiment of a computer system for implementing video calls. As will be apparent, other computer system architectures and configurations can be used to implement video calls. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown).

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage 512, 520 generally store additional programming instructions, data, and the like that typically are not in active use by the processor 502. It will be appreciated that the information retained within mass storage 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple subunits.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for implementing video calls, comprising:
   maintaining, by a server, persistent connections with a plurality of terminals used to make video calls, wherein each terminal has a universally unique identifier;
   receiving, by the server, a video call request from a calling terminal via one of the persistent connections, the video call request including the universally unique identifier of the calling terminal, and a universally unique identifier of a called terminal, wherein prior to the receiving of the video call request from the calling terminal, the universally unique identifier of the called terminal is acquired by the calling terminal, and wherein the acquiring of the universally unique identifier of the called terminal comprises:
      scanning, by the calling terminal, a Quick Response (QR) code being displayed on the called terminal, the QR code being generated based on the universally unique identifier of the called terminal;
      acquiring, by the calling terminal, the universally unique identifier of the called terminal based on the QR code; and
      during the scanning of the QR code, sending, by the calling terminal, the universally unique identifier of the calling terminal to the called terminal to be added as a contact via the one of the persistent connections;
   notifying, by the calling terminal, the called terminal via one of the persistent connections, the notification being based on the universally unique identifier of the called terminal;
   receiving, by the calling terminal, a response from the called terminal; and
   establishing a video call channel based on the received response, wherein the calling terminal and the called terminal conduct a video call via the video call channel.

2. The method as described in claim 1, further comprising:
   issuing a unique identifier to each of the plurality of terminals, the issued unique identifier corresponding to the universally unique identifier of the each terminal.

3. The method as described in claim 1, wherein the establishing of the video call channel comprises:
   establishing a point-to-point channel between the calling terminal and the called terminal; or
   establishing a stream server relay channel.

4. The method as described in claim 1, further comprising:
   allocating a different currently unique identifier to each terminal that maintains a persistent connection and that is used for video calling.

5. A method for implementing video calls, comprising:
   maintaining, at a calling terminal, a persistent connection with a server;
   sending, by the calling terminal, a video call request to the server, the video call request including a first universally unique identifier and a second universally unique identifier of a called terminal, wherein prior to the sending of the video call request, the first universally unique identifier is acquired, and wherein prior to the sending of the video call request, the second universally unique identifier of the called terminal is acquired, and wherein the acquiring of the second universally unique identifier of the called terminal comprises:
      scanning, by the calling terminal, a Quick Response (QR) code being displayed on the called terminal, the QR code being generated based on the second universally unique identifier of the called terminal;
      acquiring, by the calling terminal, the second universally unique identifier of the called terminal based on the QR code; and
      during the scanning of the QR code, sending, by the calling terminal, the first universally unique identifier of the calling terminal to the called terminal to be added as a contact via the persistent connection; and
   conducting, by the calling terminal, a video call with the called terminal via an established video call channel.

6. The method as described in claim 5, wherein the acquiring of the first universally unique identifier comprises:
   generating, by the calling terminal, the first universally unique identifier based on local hardware information.

7. A system, comprising:
   a processor; and
   a memory coupled with the processor, wherein the memory is configured to provide the processor with instructions which when executed cause the processor to:

maintain, by a server, persistent connections with a plurality of terminals used to make video calls, wherein each terminal has a universally unique identifier;

receive, by the server, a video call request from a called terminal via one of the persistent connections, wherein prior to the receiving of the video call request from a calling terminal, the universally unique identifier of the called terminal is acquired by the calling terminal, and wherein the acquiring of the universally unique identifier of the called terminal comprises to:

scan, by the calling terminal, a Quick Response (QR) code being displayed on the called terminal, the QR code being generated based on the universally unique identifier of the called terminal;

acquire, by the calling terminal, the universally unique identifier of the called terminal based on the QR code; and during the scanning of the QR code, send, by the calling terminal, the universally unique identifier of the calling terminal to the called terminal to be added as a contact via the one of the persistent connections;

notify, by the calling terminal, the called terminal via one of the persistent connections, the notifying being based on the universally unique identifier of the called terminal;

receive, by the calling terminal, a response from the called terminal; and establish a video call channel, wherein the calling terminal and the called terminal conduct a video call via the video call channel.

8. The system as described in claim 7, wherein the maintaining of the persistent connections further comprises to issue a unique identifier to each of the plurality of terminals, the issued unique identifier corresponding to the universally unique identifier of the each terminal.

9. The system as described in claim 7, wherein the establishing of the video call channel further comprises to:
establish a point-to-point channel between the calling terminal and the called terminal; or
establish a stream server relay channel.

10. The system as described in claim 7, wherein the notifying of the called terminal further comprises to allocate a different currently unique identifier to each terminal that maintains a persistent connection and that is used for video calling.

11. A computer program product for implementing video calls, the computer program product being embodied in a tangible non-transitory computer readable storage medium and comprising computer instructions for:

maintaining, by a server, persistent connections with a plurality of terminals used to make video calls, wherein each terminal has a universally unique identifier;

receiving, by the server, a video call request from a calling terminal via one of the persistent connections, the video call request including the universally unique identifier of the calling terminal, and a universally unique identifier of a called terminal, wherein prior to the receiving of the video call request from the calling terminal, the universally unique identifier of the called terminal is acquired by the calling terminal, and wherein the acquiring of the universally unique identifier of the called terminal comprises:

scanning, by the calling terminal, a Quick Response (QR) code being displayed on the called terminal, the QR code being generated based on the universally unique identifier of the called terminal;

acquiring, by the calling terminal, the universally unique identifier of the called terminal based on the QR code; and during the scanning of the QR code, sending, by the calling terminal, the universally unique identifier of the calling terminal to the called terminal to be added as a contact via the one of the persistent connections;

notifying, by the calling terminal, the called terminal via one of the persistent connections, the notification being based on the universally unique identifier of the called terminal;

receiving, by the calling terminal, a response from the called terminal; and establishing a video call channel based on the received response, wherein the calling terminal and the called terminal conduct a video call via the video call channel.

12. A computer program product for implementing video calls, the computer program product being embodied in a tangible non-transitory computer readable storage medium and comprising computer instructions for:

maintaining, at a calling terminal, a persistent connection with a server;

sending, by the calling terminal, a video call request to the server, the video call request including a first universally unique identifier and a second universally unique identifier of a called terminal, wherein prior to the sending of the video call request, the first universally unique identifier is acquired, and wherein prior to the sending of the video call request, the second universally unique identifier of the called terminal is acquired, and wherein the acquiring of the second universally unique identifier of the called terminal comprises:

scanning, by the calling terminal, a Quick Response (QR) code being displayed on the called terminal, the QR code being generated based on the second universally unique identifier of the called terminal;

acquiring, by the calling terminal, the second universally unique identifier of the called terminal based on the QR code; and during the scanning of the QR code, sending, by the calling terminal, the first universally unique identifier of the calling terminal to the called terminal to be added as a contact via the persistent connection; and conducting, by the calling terminal, a video call with the called terminal via an established video call channel.

* * * * *

UNITED STATES PATENT AND TRADEMARK OFFICE
CERTIFICATE OF CORRECTION

PATENT NO. : 10,375,351 B2
APPLICATION NO. : 15/600324
DATED : August 6, 2019
INVENTOR(S) : Wuping Du, Wei Peng and Ming Zong Page 1 of 1

It is certified that error appears in the above-identified patent and that said Letters Patent is hereby corrected as shown below:

In the Specification

Column 5, Line 18, after "UUID", insert --1--.

Signed and Sealed this
Third Day of March, 2020

Andrei Iancu
*Director of the United States Patent and Trademark Office*